(12) United States Patent
Updyke

(10) Patent No.: US 9,205,723 B2
(45) Date of Patent: Dec. 8, 2015

(54) DOG SHADING SCREEN

(71) Applicant: M. Carol Updyke, Ketchum, ID (US)

(72) Inventor: M. Carol Updyke, Ketchum, ID (US)

(*) Notice: Subject to any disclaimer, the term of this patent is extended or adjusted under 35 U.S.C. 154(b) by 18 days.

(21) Appl. No.: 14/075,766

(22) Filed: Nov. 8, 2013

(65) Prior Publication Data

US 2014/0174675 A1 Jun. 26, 2014

Related U.S. Application Data

(60) Provisional application No. 61/723,933, filed on Nov. 8, 2012.

(51) Int. Cl.
*B60J 1/20* (2006.01)

(52) U.S. Cl.
CPC .............. *B60J 1/2011* (2013.01); *B60J 1/2091* (2013.01)

(58) Field of Classification Search
CPC .............. B60R 21/06; A47H 2201/00; A47H 2201/02; E06B 9/521
USPC .......... 160/180, 368.1, 179; 296/24.31, 24.43
See application file for complete search history.

(56) References Cited

U.S. PATENT DOCUMENTS

| 3,276,512 | A | * | 10/1966 | Gallagher | 160/368.1 |
|---|---|---|---|---|---|
| 3,632,154 | A | * | 1/1972 | Woodrich | 296/24.41 |
| 4,100,957 | A | * | 7/1978 | Shelton | 160/368.1 |
| 4,544,195 | A | * | 10/1985 | Gunn | 296/26.11 |
| 5,238,282 | A | * | 8/1993 | Watson et al. | 296/24.41 |
| 5,358,025 | A | * | 10/1994 | Wood | 160/368.1 |
| 5,427,169 | A | * | 6/1995 | Saulters | 160/368.1 |
| 5,879,048 | A | | 3/1999 | Tower | |
| 6,012,753 | A | | 1/2000 | Ordoyne et al. | |
| 6,119,760 | A | * | 9/2000 | Poole | 160/330 |
| 6,725,807 | B1 | | 4/2004 | Tapia | |
| 6,796,358 | B1 | | 9/2004 | Moore | |
| 6,962,382 | B2 | * | 11/2005 | Scarlett | 296/24.46 |
| 7,036,869 | B1 | | 5/2006 | Stipanovich | |
| 7,150,246 | B1 | | 12/2006 | Weimer | |
| 7,717,484 | B2 | * | 5/2010 | Parle et al. | 296/24.4 |
| 7,789,445 | B2 | * | 9/2010 | Hoffman et al. | 296/24.31 |
| 2003/0090119 | A1 | * | 5/2003 | Bateman | 296/24.1 |
| 2006/0103155 | A1 | * | 5/2006 | Spater et al. | 296/24.46 |
| 2008/0005967 | A1 | | 1/2008 | Johnson et al. | |
| 2008/0122238 | A1 | | 5/2008 | Fulmer | |

* cited by examiner

*Primary Examiner* — Blair M Johnson

(74) *Attorney, Agent, or Firm* — Robert L. Shaver; Shaver & Swanson, LLP

(57) ABSTRACT

A removable dog screen for placement in the rear opening door of a vehicle to provide shade and ventilation to an animal within the vehicle for a short period of time. The disclosure provides for a removable dog screen that spans across the rear opening of a vehicle such as an SUV. Disclosed system incorporates elastic bands for keeping the screen taught as well as mesh material allowing for ventilation.

3 Claims, 4 Drawing Sheets

DOG SHADING SCREEN

PRIORITY/CROSS-REFERENCE TO RELATED APPLICATIONS

This application claims the benefit of U.S. Provisional Application No. 61/723,933 filed Nov. 8, 2012, the disclosure of which is incorporated by reference.

TECHNICAL FIELD

The presently disclosed and claimed inventive concepts generally relate to an apparatus for shading an animal in a vehicle, and more particularly to a dog screen for a vehicle

BACKGROUND

Dog owners routinely transport their dogs within their cars. This can be done over long distances or simply to allow the dog to get out of the house while the owner is running an errand. No matter the reason, it is not uncommon for the owner to leave the dog unattended within the vehicle for short periods of time. Even over short periods of time the car can become too hot for the dog due to lack of air flow and shade for the dog to be in.

During the summer months the temperature inside a car can be well above the ambient temperature outside of the car. Every year many dogs are left in hot cars without adequate shade or ventilation. Some of these dogs eventually die due to the heat within the car, often without the owner realizing the danger until it is too late.

To combat this many owners will leave the windows rolled down slightly or entirely. This is suitable for smaller dogs that are present in the passenger space of the car, but larger dogs contained within the passenger space can escape over the window edge unless the window is sufficiently closed, reducing the likelihood of escape but also reducing air flow.

Often, large dogs are transported within the cargo area of an SUV, wagon, hatchback, or other vehicle with a rear-opening door, such as a lift gate, tail gate, swing gate, ambulance doors, or similar openings. This allows the dog to have sufficient room to stand and move around without being a distraction to the driver. Unfortunately, dogs contained within the cargo compartment of an SUV or wagon are most likely out of the path of the fresh air from windows and unable to escape the sunlight coming through the closed cargo compartment windows.

The prior art features the placement of mesh or screen devices to block the opening created by rolling down the window. Often these mechanisms require cumbersome attachment means and may not provide adequate shade and ventilation for a dog. These devices do not provide much, if any, shade and ventilation to the cargo area of a larger vehicle.

SUMMARY OF THE DISCLOSURE

Disclosed is a means for providing shade and ventilation for a dog in an automobile with a rear opening door, such as a lift gate, tail gate, swing gate, hatch back, ambulance doors, or the like. These automobiles are referred to here as having "rear-opening doors," to differentiate from the rear doors on the side of a 4 door vehicle. Disclosed is a shade and ventilation screen that attaches to the interior of the sidewalls of such automobiles, with the screen spanning the space, both vertically and horizontally, the opening created when the rear-opening door of an automobile is in the open position. In this way, the disclosed apparatus deters a dog from exiting the automobile, while providing sufficient ventilation and shade such that a dog owner can feel comfortable leaving the dogs unattended in the vehicle for short periods of time during a hot day.

The apparatus includes a screen that allows for ventilation and shade. The screen is generally hexagonal in shape, approximately the size of the opening or void created when a rear-opening automobile door is in the open position. The screen has a border with a plurality of elastic pulls sewn or otherwise integrated into it. At each of the elastic pulls is a connection point. The screen attaches, at the connection points, to attachment means affixed to the interior sidewalls of the automobile. The attachment points can be various types such as 3M Dual Lock adhesive tape, that are adherable to the interior sidewall of the automobile. Such devices typically have a flat side, opposite the connecting structure, with an adhesive. The user adheres the material to a surface—in this case, the interior of an automobile—allowing the material to remain fixed to that surface. The material, hooks, D rings or loops are arranged in positions that correlate to the location of the connection points on the screen, as shown in the included figures. The connection points, which, in the preferred embodiment, are rings, may be connected to the hooks such that the screen is suspended from the hooks, spanning the automobile's rear opening. The elastic at the connection points, which is integrated into the screen's border, keeps the screen taught, such that it closely approximates the size of the automobile's rear opening. The screen is also equipped with a zippered door within the screen itself. The door is rectangular in shape and comprised of two zippered sides, similar to the zippered door of a tent.

In certain embodiments the screen can be rolled or folded into a compact state in order to store the screen in an out of the way area, such as attached to the ceiling. Such storage mechanisms can be configured so that the screen is readily deployable requiring only unrolling from the ceiling of the car and attachment to the sides of the vehicle. Further, these storage mechanisms can be motorized to allow for a minimal physical effort by a user.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept (s) in any way.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DEFINITIONS

Figure 1:
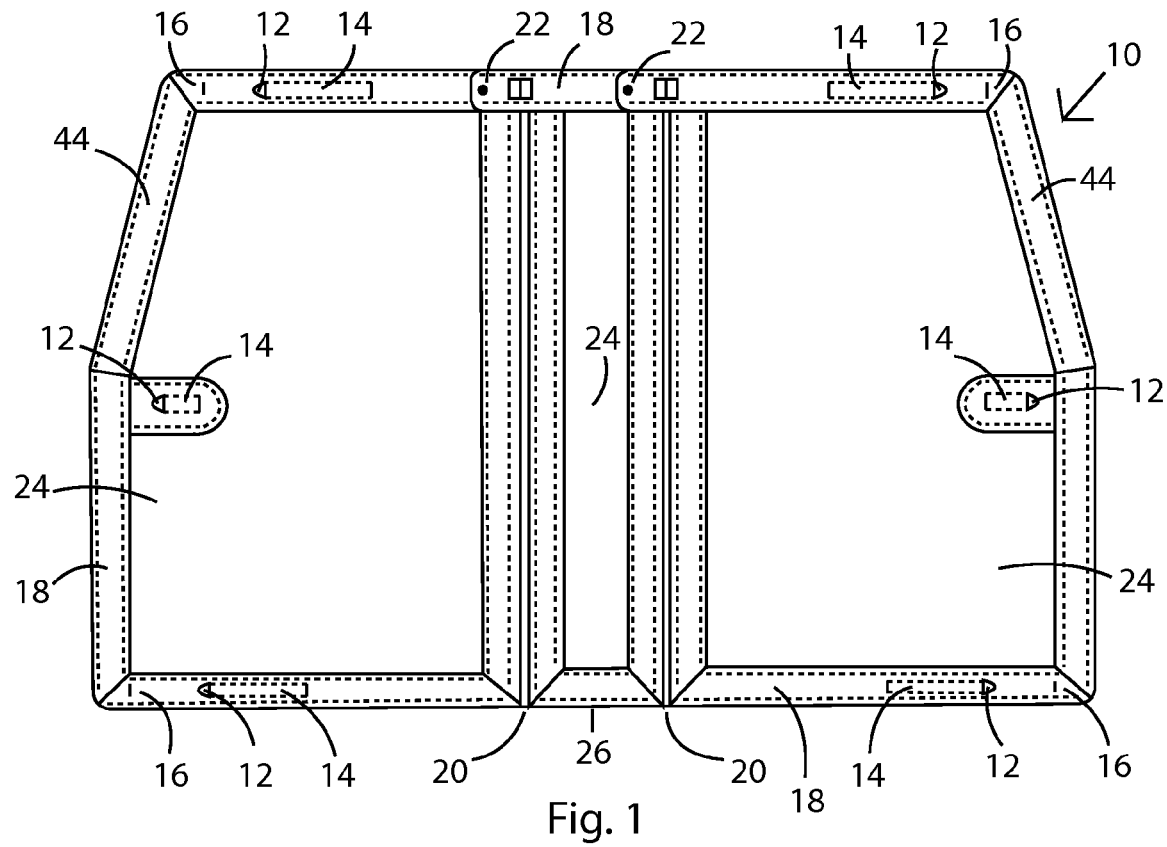
FIG. 1 is a schematic of a dog screen in accordance with an embodiment of the inventive concepts.

In the following description and in the figures, like elements are identified with like reference numerals.

The use of "e.g.," "etc," and "or" indicates non-exclusive alternatives without limitation unless otherwise noted.

The use of "including" means "including, but not limited to," unless otherwise noted.

DETAILED DESCRIPTION OF THE EXEMPLARY EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Disclosed in FIG. 1 is dog screen 10. Dog screen 10 provides for shade and ventilation for use in an automobile that has a rear opening door such as an SUV or other vehicle having a door in the rear of the vehicle. Dog screen 10 is generally polygonal in shape such as the hexagonal shape shown in FIG. 1. The polygonal shape is formed by border 18. While border 18 can be constructed utilizing many materials, a preferred material for the border is 1.5 inch polypro herringbone webbing. The material over the elastic is preferably heavy duck fabric with a weight of 7.6 ounces per yard. A preferred fabric for the screen material is Textilene 80, a solar screen fabric with preferable features. The dog screen in FIG. 1 has six screen hooks 12, one located at each corner of the screen. These hooks are attached to dog screen 10 using elastic material 14. Elastic material 14 is enclosed within border 18. Once attached to elastic material 14 the hook is placed through the slit 16 in border 18 and is then in position to connect to the vehicle.

Figure 2:
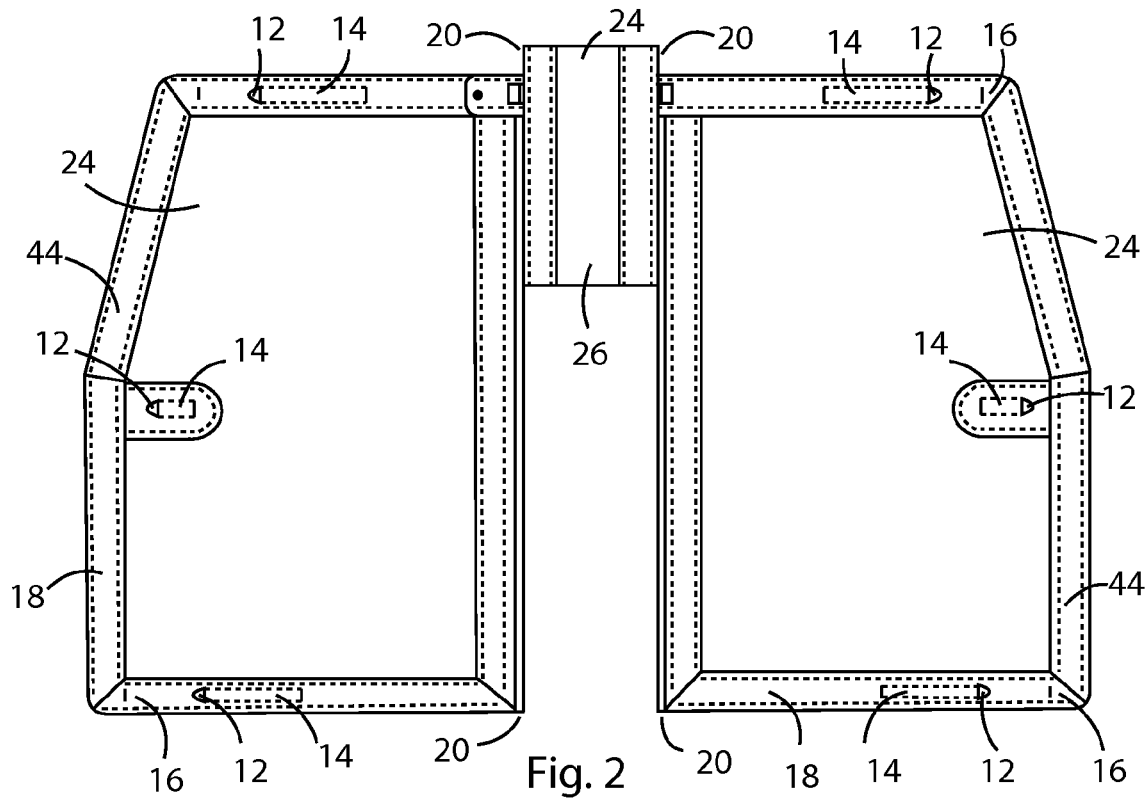
FIG. 2 is a schematic of a dog screen in accordance with an embodiment of the inventive concepts.

Dog screen 10 also has door section 26. Zippers 20 can be unzipped individually or can both be partially unzipped in order to allow the door section 26 to be folded and placed out of the way. A preferred size of the zipper 20 is 32 inches. One method for keeping door section 26 stored is featured in FIG. 2 where door section 26 is simply rolled at the top or folded over and attached at the top of dog screen 10. While this embodiment is preferred for its simplicity, other methods are useable such as Velcro, snaps, magnets, or buckles. This border makes up the exterior of dog screen 10 as well as the border in the individual panels or sections. These sections are held together using zippers 20, snap 22, or both. Snap 22 operates to hold flaps 38 in position over the ends of zippers 20. These flaps act to hold the dog screen 10 together and prevent a user from accidentally totally unzipping of zippers 20. In this configuration, upon unzipping zippers 20 the elastic material 14 will pull the main panels 44 away from each other thus expanding the open area formed by the opening of door panel 26.

Figure 3:
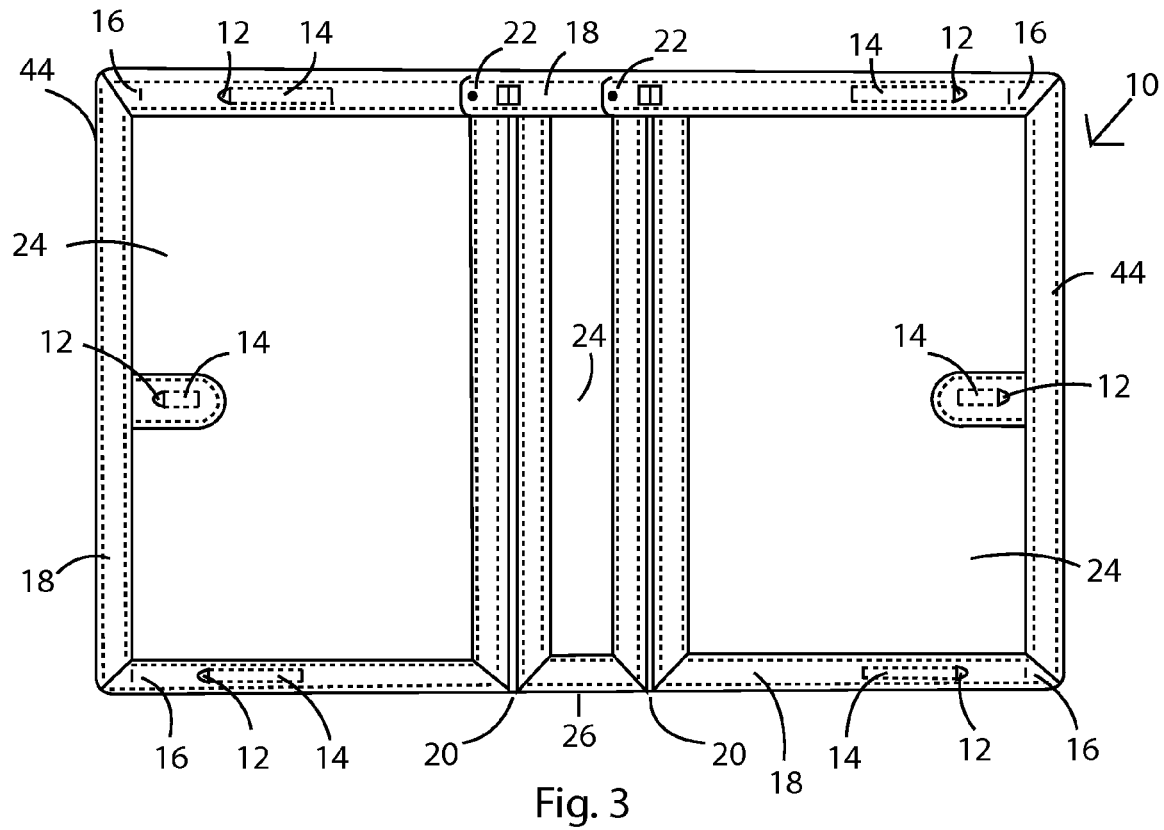
FIG. 3 is a schematic of a dog screen in accordance with an embodiment of the inventive concepts.

The interior sections of main panels 44 and door section 26 are made using mesh 24. The use of a mesh provides shade while also allowing for movement of air into and out of the vehicle. While many types of mesh are available, the preferred embodiment uses a UVA mesh. FIG. 3 illustrates one alternative shape of dog screen 10. FIG. 3 illustrates a rectangular shape of dog screen 10. Although additional shapes are available, hexagonal and rectangular are shown as preferred embodiments and for example purposes.

Zippers 20 allow for removal of door section 26. Once door section 26 is removed, dog screen 10 functions having a single zipper. Door section 26 of different widths allow for dog screen 10 to fit larger vehicles without necessitating specific manufacturing for each individual car size.

Figure 4:
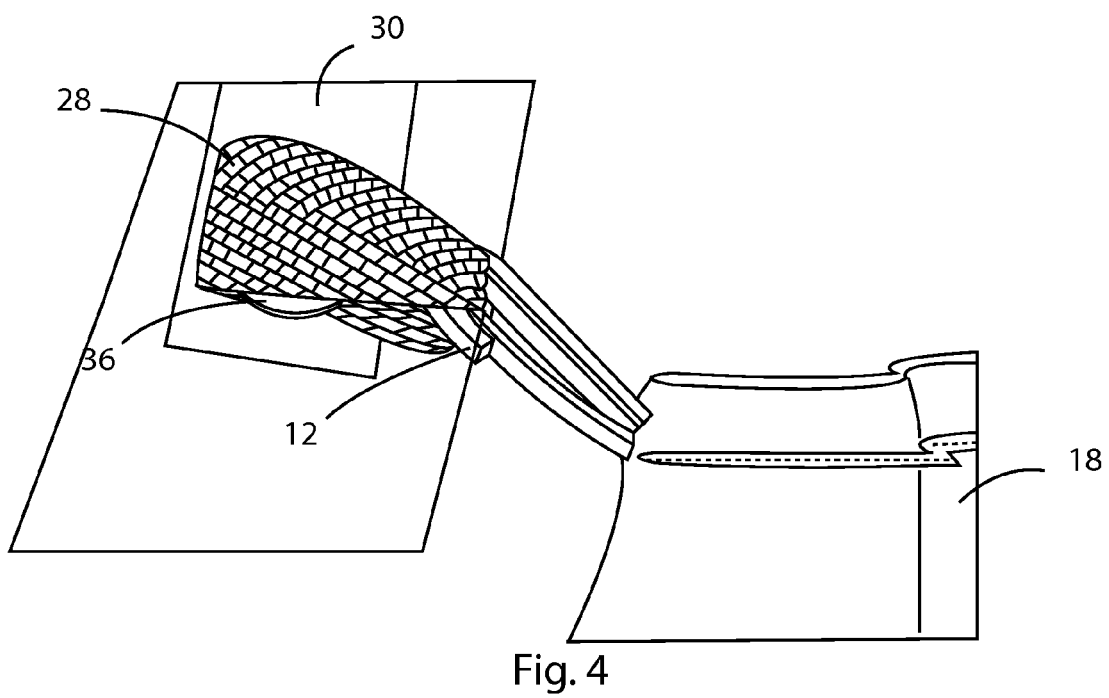
FIG. 4 is a perspective view of a dog screen fastening device in accordance with an embodiment of the inventive concepts.

FIG. 4 shows an embodiment of a device for connecting the dog screen 10 to the sidewall of the vehicle. Shown in FIG. 4 is border 18 having a screen hook 12 attached to the dog screen. Screen hook 12 is then connected to an attachment loop 28. Attachment loop 28 is connected to screen fastener 36. Screen fastener 36 is preferably releasably attached to the vehicle using car fastener 30. While many structures are available to attach the loop to the vehicle including Velcro or snaps, in a preferred embodiment a 3M™ Dual Lock™ is used because of its availability, cost and holding strength. Other connections are also possible, such as points built into the vehicle sidewall, magnets, D-Rings, clips, carabiners, hooks, and other conventional attachment devices.

Figure 5:
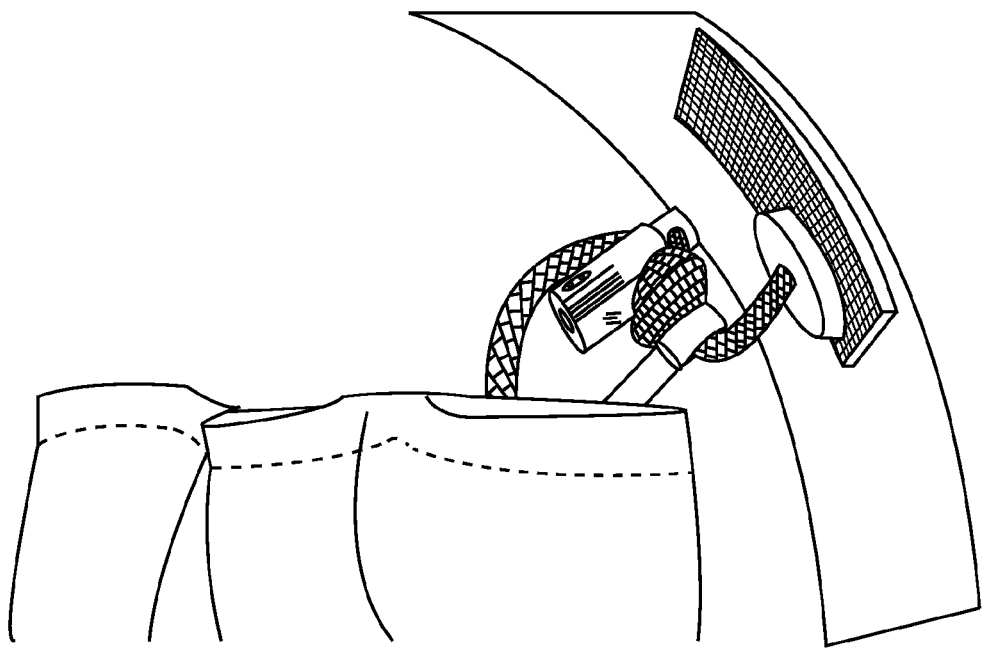
FIG. 5 is a perspective view of a dog screen fastening device in accordance with an embodiment of the inventive concepts.

FIG. 5 shows a second preferred embodiment of a mechanism for connecting the dog screen to the vehicle. In this embodiment the dog screen 10 still has border 18 with screen hook 12 extending from the screen. A patch of 3M™ Dual Lock™ is placed on the vehicle interior to which the screen fastener 36, also having 3M™ Dual Lock™, can then be attached. The embodiment featured in FIG. 6 utilizes a length of cord 32 attached to screen fastener 36. This length of cord has a clip 34 attached to it. This clip is of the type that automatically locks in place but can be adjusted by squeezing the two ends of the clip together and moving to the desired location. This configuration allows for adjustability of the screen taughtness as well as placement. Once again mechanisms for attaching are available such as snaps or buckles with these embodiments being shown for exemplary purposes.

Other attachment mechanisms are available. Buttons with corresponding fabric slots are adequate, as well as sufficiently strong magnetic closures. Dog screen 10 can utilize attachment points built into the car, such as hooks, D-Rings, bars, or other suitable mechanisms. In such cases it is unnecessary to attach an additional piece, such as the 3M™ Dual Lock™, to the interior of the vehicle.

Figure 6:
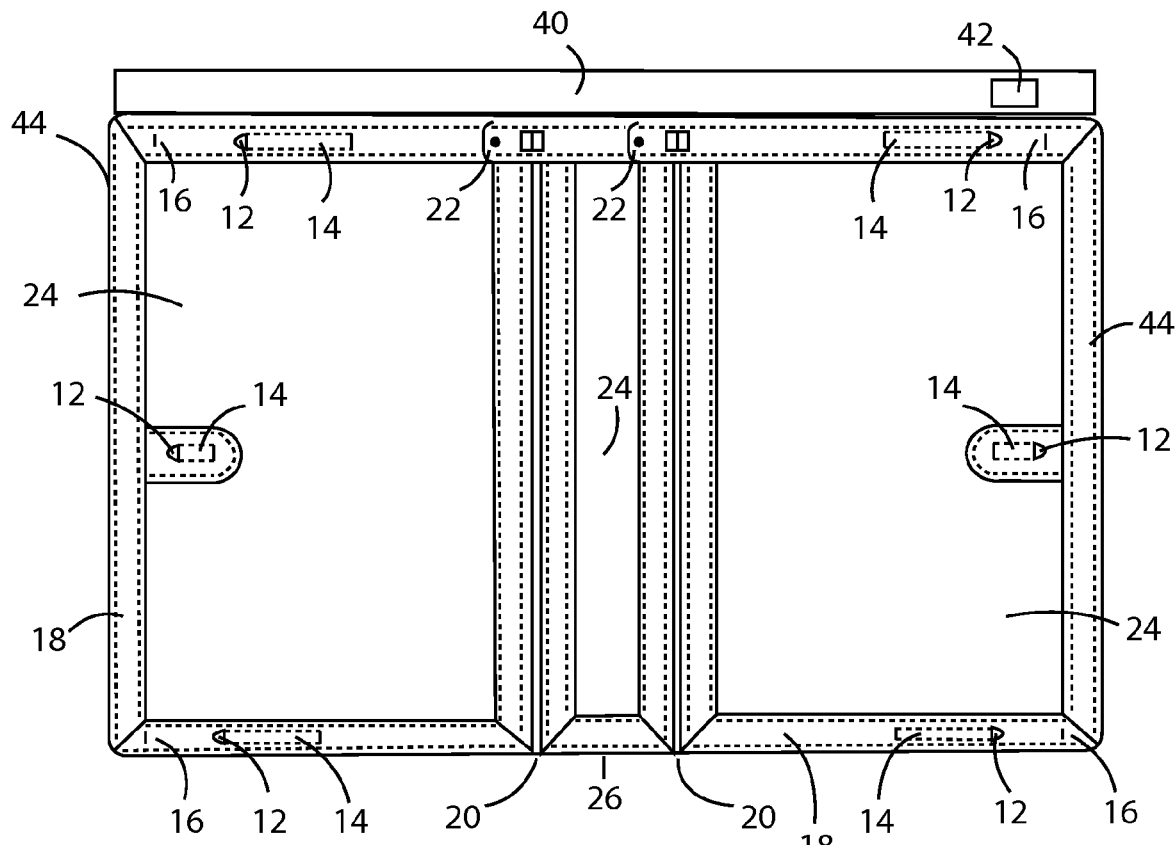
FIG. 6 is a view of a dog screen in accordance with an embodiment of the inventive concepts.

FIG. 6 shows an alternative embodiment of dog screen 10. Included in this embodiment is a roller 40 capable of rolling dog screen 10 into a stored configuration. Roller 40 further has motor 42 attached. This configuration enables a user to roll dog screen 10 into a stored configuration with minimal physical effort by the user. Other storage mechanisms are acceptable including a roller without a motor, drawstrings similar to window blinds, straps attached to the top or bottom of the dog screen to hold the dog screen in a folded position, and other capable mechanisms.

Figure 7:
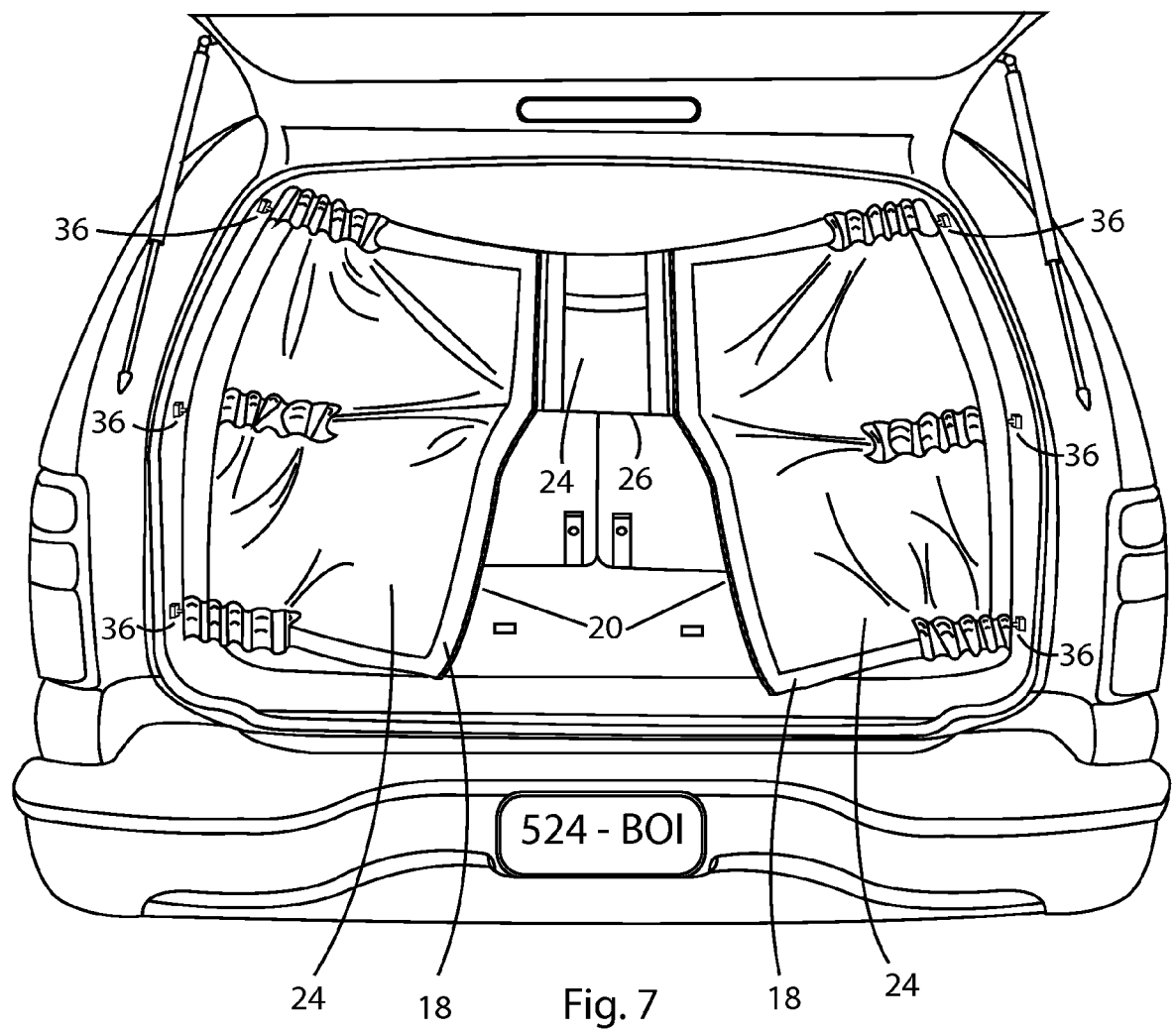
FIG. 7 is a view of the dog screen mounted in a vehicle.

FIG. 7 shows the screen 10 mounted in a vehicle, with the center band partially unzipped and looped to attach to the top of the screen 10.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A dog shading screen for use in a vehicle with a rear-opening door, comprising:
    a generally polygonal screen with a border and at least one openable door in said screen, said openable door comprised of two vertical zippers on either side of a removable band, with the removable band configured for rolling up and being secured in a rolled up position;
    said generally polygonal screen sized to generally extend from sidewall to sidewall inside said vehicle, with said screen of a material that allows air to pass through freely;
    a plurality of connection points in said screen border, said connection points having elastic pulls, for securing said connection points to said vehicle sidewalls;
    a plurality of anchor points attachable to said vehicle sidewall, and configured for removable engagement with said connection points;
    wherein said screen when attached to vehicle sidewalls forms a containment zone for pets in the rear of a vehicle, in which air circulation is improved over a closed vehicle, and in which a pet is contained in said vehicle by said screen, in which said screen further comprises a roller attached to said vehicle interior for rolling said screen into a compact roll for storage.

2. The dog shading screen of claim 1 which further comprises one or more attachment points for affixing said screen to a vehicle floor.

3. The dog shading screen of claim 1 which further comprises a motor for rolling said screen onto said roller for rolling said screen into a compact roll for storage.

* * * * *